United States Patent [19]

Davis, Jr. et al.

[11] Patent Number: 4,830,870

[45] Date of Patent: May 16, 1989

[54] METHOD FOR INCREASING STABILITY OF LIQUID BEVERAGE CONCENTRATE

[75] Inventors: Charles W. Davis, Jr., Iselin; Charles L. Fairchild, East Windsor; Joanne Marie-Colletti Folkers, Hillsdale; Robert C. Kendall, Hamilton Square, all of N.J.

[73] Assignee: General Foods Corporation, White Plains, N.Y.

[21] Appl. No.: 918,737

[22] Filed: Oct. 14, 1986

Related U.S. Application Data

[63] Continuation-in-part of Ser. No. 779,376, Sep. 23, 1985, abandoned.

[30] Foreign Application Priority Data

Nov. 9, 1986 [CA] Canada ................................. 515362

[51] Int. Cl.⁴ .............................................. A23L 2/02
[52] U.S. Cl. .................... 426/599; 426/590
[58] Field of Search ............ 426/106, 108, 599, 330 S, 426/120, 119, 330.3, 330.4, 333, 590, 616, 393, 398, 11 S

[56] References Cited

U.S. PATENT DOCUMENTS

| | | | |
|---|---|---|---|
| 1,955,864 | 4/1934 | Stevens | 426/333 |
| 2,631,521 | 3/1953 | Atkins | 426/120 |
| 3,112,202 | 11/1963 | Wadsworth | 426/616 |
| 3,305,368 | 2/1967 | Bourelle | 426/120 |
| 3,499,578 | 1/1966 | O'Neal | 426/115 |
| 3,729,553 | 4/1973 | Gold | 426/120 |
| 3,743,520 | 7/1973 | Croner | 426/115 |
| 3,782,972 | 1/1974 | Atkins et al. | 426/192 |
| 4,333,581 | 6/1982 | Flansburg | 426/120 |
| 4,477,481 | 10/1984 | Eisenhardt | 426/616 |
| 4,529,606 | 7/1985 | Fustier et al. | 426/330.3 |
| 4,547,384 | 10/1985 | Kryger | 426/599 |

FOREIGN PATENT DOCUMENTS

| | | | |
|---|---|---|---|
| 0047169 | 3/1982 | European Pat. Off. | 426/106 |
| 2729390 | 11/1979 | Fed. Rep. of Germany | 426/120 |
| 60-91961 | 5/1985 | Japan | 426/105 |
| 61-63259 | 4/1986 | Japan | 426/106 |
| 449051 | 6/1936 | United Kingdom | 426/120 |
| 1180059 | 12/1967 | United Kingdom | 426/120 |

OTHER PUBLICATIONS

Murdock and Hunter, J. Food Science, vol. 35, p. 652–655 (1970).

Clark et al., "The Acid Catalyzed Cyclization of Citral", Tetrahedron, vol. 33, pp. 2187–2191 (1977).

Shaw, "Review of Quantitative Analysis of Citrus Essential Oils", J. Agric. Food Chem., vol. 27, No. 2, pp. 246–257 (1979).

*Primary Examiner*—Donald E. Czaja
*Assistant Examiner*—Carolyn Paden
*Attorney, Agent, or Firm*—Thomas R. Savoie; Daniel J. Donovan

[57] ABSTRACT

A citrus flavored beverage concentrate for use in food service beverage dispensers is disclosed which exhibits excellent citrus oil stability. A multiple component concentrate is used, with one component containing the citrus oil and being at a pH of about 3.7 to about 4.6, and a second component which is highly acidic, being at a pH of 1.4 to 3.0, depending on the flavor of the beverage.

9 Claims, No Drawings

METHOD FOR INCREASING STABILITY OF LIQUID BEVERAGE CONCENTRATE

This application is a continuation-in-part of U.S. Ser. No. 779,376, filed Sept. 23, 1985 and now abandoned.

TECHNICAL FIELD

The invention relates to a method for improving the quality of a citrus-flavored beverage. More specifically, the invention relates to increasing the stability of a citrus-flavored beverage by maintaining the citrus oils separate from a second medium, which is acidic, during storage. The invention contemplates combination of a citrus oil-containing stream with a highly acidic medium prior to consumption in instances where an acidic flavor is desired.

BACKGROUND

Citrus-flavored beverages have earned great popularity in the marketplace. One particularly popular type of citrus flavored beverage is the type dispensed by food serve operators from dispensing equipment at restaurants and other food service locations.

In a common dispensing arrangement, two liquid streams are combined by the dispensing equipment to produce a beverage that is ready-to-drink, the first liquid stream typically being water and the second liquid stream typically being a concentrated aqueous beverage mixture. The marketing of aqueous beverage mixtures, referred to as post-mix syrup in the trade, allows beverage producers to reduce the beverage volume which must be packaged and shipped, thereby resulting in a cost savings.

In the production of citrus-flavored beverage concentrates, a problem with citrus flavor stability has been identified. It has been discovered that, during typical citrus-flavored beverage concentrate storage, the citrus flavor itself is unstable and, in many instances, changes in character prior to final preparation in a food service dispenser or at the post as it is referred to in the trade. The poor citrus flavor stability has been found by the inventors to be particularly pronounced in citrus-flavored beverage concentrates containing lemon oil, with a noticable absence of lemon flavor existing at the time when the lemon flavored concentrate is generally used to produce a ready-to-drink beverage.

U.S. Pat. No. 4,529,606 to Fustier et al. teaches that a citrus-flavored ready-to-drink beverage contained in a polyethylene container exhibits reduced flavor loss, minimized off-flavor development, and extended shelf-life by the addition of small amounts of coconut oil or dearomatized cocoa butter to the beverage.

Atkins et al. in U.S. Pat. No. 3,782,972 teach preparation of an enhanced citrus essence by increasing the alcoholic content of the aqueous phase of the essence so that its capacity for desirable aldehyde type components is increased.

Murdock and Hunter in *Journal of Food Science*, Volume 35 (1970), pp. 652–655, disclose that tangerine, lemon and grapefruit oil emulsions have been shown to undergo undesirable modification as a result of microbial growth.

SUMMARY OF THE INVENTION

It has now been found that a citrus-flavored beverage concentrate is produced having excellent shelf life stability by maintaining the citrus oils separate from a second acidic medium during storage. It has been found further that a high quality citrus-flavored beverage may be produced having an acidic character by combining the citrus oil-containing stream and the second medium, which is highly acidic in character, with a third stream made up of water. Thus, the invention enables beverage producers to continue to benefit from the cost savings associated with shipment of a citrus-flavored beverage concentrate and also to deliver a beverage product exhibiting citrus oil flavor stability.

DETAILED DESCRIPTION OF THE INVENTION

A citrus-flavored beverage may contain water, flavor emulsion, acid, sweetener, preservative, buffer, color, clouding agent, etc. Savings in shipping and packaging costs are accomplished by reducing the water level in the citrus flavored beverage such that a citrus-flavored beverage concentrate is marketed. Surprisingly, it has been found that maintaining the citrus-flavored oil which is part of the typical flavor emulsion, in a relatively low-acid environment prior to beverage preparation results in a much improved flavor oil stability.

According to the invention, the ingredients of a citrus-flavored beverage concentrate are separated into multiple components, typically two separate streams which in turn are combined with a third, or water, stream. In one aqueous component is placed the flavor oil. In a second aqueous component is placed a majority of the acid which is desired for the final beverage product. As such, the acid-containing component is at a substantially lower pH, i.e. it is substantially more acidic, than the citrus oil-containing component, thereby reducing the necessary acidity of the oil component. The invention contemplates maintaining the citrus oil-containing component separate from the acid-containing component until the final beverage is prepared for consumption.

In a preferred embodiment of the invention, a citrus-flavored beverage concentrate is separated into two components, the acid-containing and citrus oil-containing components. The ratio at which these two components are combined in preparing a final beverage is within the skill of one having ordinary skill in the art. Generally, the ratio of the acid-containing component to the citrus oil-containing component ranges from 40:60 to 60:40 by volume. These two components, once combined, are typically diluted by water at a ratio of 3:1 to 6:1 by volume water to said combination in preparing a final beverage. Solubility limitations of the beverage ingredients generally govern the water ratio in a given application.

Of critical importance to the operation of the present invention are the pH and total acidity of the citrus oil-containing component and the acid-containing component. The acidic character of fruit-flavored beverages is essential to flavor quality and thus consumer acceptance, with some beverage flavors, such as lemonade, requiring a highly acidic character in order to deliver a high quality flavor. Some beverage flavors, however, such as iced tea with lemon or lemon flavoring, do not require as acidic a character as lemonade. Nonetheless, an improvement in citrus oil stability is obtained according to the present invention regardless of the degree of acidic character desired in the final beverage.

According to the invention, the citrus oil-containing component is prepared at a pH of about 3.7 to about 4.6 and preferably at a pH of about 3.8 to about 4.2 with 4.1 being the optimum pH. The pH of the acid-containing component is dependent upon the acid character which is desired for the finished beverage flavor being prepared, with an acid-containing component pH of about 1.4 to about 1.8 being typical for lemonade-type flavors and a pH of about 2.5 to about 3.0 being typical for iced tea (with lemon) type flavors. It has been found that preparation of the citrus oil-containing component at a pH of about 3.8 to about 4.2 results in a tremendous increase in flavor oil stability as measured organoleptically and analytically as compared to a typical "single component" beverage concentrate wherein the acid and citrus oil are packaged together. It also appears that, along with pH, total acidity (T.A.) is important to the stability of the flavor oils. Beneficial flavor oil stability of the present invention is obtained over "single component" beverage concentrates which have a pH range from about 2.6 to about 4.0.

Although aspartame (APM) is a preferred sweetener the sweetener component may be selected from natural or synthetic sweeteners capable of imparting the desired sweetness to the finished beverage. Some, but certainly not all, of these sweeteners are selected from the group consisting of sugars, aspartame, amino acid based sweeteners, depeptide sweeteners, glycyrrhizin, saccharin and its salts, acesulfame salts, cyclamates, steviosides, talin, dehydrochalcone compounds, chlorosucrose, peptide sweeteners, as well as any new or future discovered sweeteners. Several other advantages are realized according to the operation of the invention. In the case of an APM-sweetened beverage concentrate, it has been found that the optimum of APM stability is about 4.0 to about 4.5 and, as such, inclusion of APM in the citrus oil-containing component results in increased APM stability as compared to prior art "single component" beverage concentrates. If sugars or other non-pH sensitive sweeteners are used, they may be present in both or either component of the beverage mix.

Having thus described the invention, the operation of the invention is further illustrated by reference to the following examples:

EXAMPLE 1

| | Weight Percent |
|---|---|
| Citrus Oil-Containing Component | |
| Water | 94.7 |
| Lemon Oil Emulsion | 1.6 |
| Potassium Citrate | 1.4 |
| Citric Acid | 1.4 |
| APM | 0.6 |
| Preservatives | 0.3 |
| | 100.0 |
| Acid-Containing Component | |
| Water | 91.9 |
| Citric Acid | 7.9 |
| Preservative | 0.2 |
| | 100.0 |

The pH of the citrus oil-containing component was 4.1 with a T.A. of 1.43% while the pH of the acid-containing component was 1.5.

The citrus oil-containing component and the acid-containing component were blended at a ratio of 1:1 to form a combination, said combination having a pH of about 2.7. The combination was then diluted by water at a ratio of 5:1 by volume water to combination. The lemonade beverage produced was judged to be of excellent quality, having an excellent lemon flavor.

EXAMPLE 2

A lemonade beverage concentrate was prepared in two components according to the following formulae:

| | Weight Percent |
|---|---|
| Citrus Oil-Containing Component | |
| Water | 97.0 |
| Lemon Oil Emulsion | 1.6 |
| Citric Acid | 0.5 |
| APM | 0.6 |
| Preservatives | 0.3 |
| | 100.0 |
| Acid-Containing Component | |
| Water | 90.5 |
| Citric Acid | 7.9 |
| Preservative | 0.2 |
| Potassium Citrate | 1.4 |
| | 100.0 |

The pH of the citrus oil-containing component was 4.1 with a T.A. of 0.5% while the pH of the acid-containing component was 1.5.

The citrus oil-containing component and the acid-containing component were blended at a ratio of 1:1 to form a combination, said combination having a pH of about 2.7. The combination was then diluted by water at a ratio of 5:1 by volume water to combination. The lemonade beverage thus produced was also judged to be of excellent quality, having an excellent lemon flavor.

A control lemonade beverage concentrate was prepared having the following formula:

| Control | |
|---|---|
| | Weight Percent |
| Water | 93.4 |
| Citric Acid | 4.6 |
| Lemon Oil Emulsion | 0.8 |
| Potassium Citrate | 0.7 |
| APM | 0.3 |
| Preservatives | 0.2 |
| | 100.0 |

The formula of this control corresponds exactly to the formula of the "combination" produced by mixing the oil- and acid-containing components of Example 1. The pH of the control was 2.7. It was diluted by water at a ratio of 5:1 water to control.

A storage study was conducted on the two component lemonade beverage concentrates of Examples 1 and 2 and the control lemonade beverage concentrate. It was found that beverages produced from Examples 1 and 2 exhibited an excellent lemon flavor over extended storage periods (approximately 12 or more weeks) whereas the control beverage concentrate produced beverages having an unacceptable, lime-type flavor after less than 2 weeks of storage.

We claim:

1. A packaged, lemon-flavored, aqueous beverage concentrate comprised of water, acid, lemon oil and sweetener and having improved storage stability of the lemon flavor comprising:
   (a) a package containing two liquid components, wherein the lemon-flavored, aqueous beverage concentrate consists of said two liquid components, wherein the liquid components are separated from each other and wherein the volume ratio of the liquid components contained in the package range from 40:60 to 60:40, and wherein, (b) one liquid component is comprised of water, sweetener, lemon oil, and acid and has a pH of from about 3.7 to about 4.6; and (c) the other liquid component is comprised of water and acid, has a pH of from about 1.4 to about 3.0 and does not contain lemon oil.

2. The packaged beverage concentrate of claim 1 wherein the lemon oil-containing component consists of water, acid, lemon oil, sweetener, buffer and preservative.

3. The packaged beverage concentrate of claim 1, wherein the sweetener is selected from the group consisting of: sugars, aspartame, amino acid based sweeteners, dipeptide sweeteners, glycyrrhizin, saccharin and its salts, acesulfame salts, cyclamates, steviosides, talin, dihydrochalcone compounds, chlorosucrose and peptide sweeteners.

4. The packaged beverage concentrate of calim 1, wherein the sweetener is aspartame.

5. The packaged beverage concentrate of claim 1 wherein the pH of the lemon oil-containing component is from about 3.8 to about 4.2.

6. The packaged beverage concentrate of claim 1 wherein the pH of the lemon oil-free component is from 1.4 to about 1.8.

7. A method of obtaining a packaged, storage-stable, lemon-oil containing aqueous beverage concentrate comprised of water, acid, lemon oil, and sweetener comprising the steps of:

(a) preparing a first aqueous component comprised of water, sweetener, lemon oil and acid and having a pH from about 3.7 to about 4.6;

(b) preparing a second aqueous component comprised of water and acid, having a pH of from about 1.4 to about 3.0 and being free of lemon oil; and (c) placing said first and second components in a package such that the two components are maintained separate from each other during storage and until it is desired to produce a lemon-flavored beverage by combining the two components and water, the volume ratio of the first and second components being packaged ranging from 40:60 to 60:40.

8. The method of claim 7 wherein the pH of the lemon-oil containing component is from about 3.8 to about 4.2.

9. The method of claim 7 wherein the pH of the lemon oil-free component is from 1.4 to about 1.8.

* * * * *